US009763137B2

United States Patent
Allanki et al.

(10) Patent No.: US 9,763,137 B2
(45) Date of Patent: Sep. 12, 2017

(54) PREDICTIVE LOAD BALANCING

(71) Applicant: Cable Television Laboratories, Inc., Louisville, CO (US)

(72) Inventors: Neeharika Allanki, Boulder, CO (US); Alireza Babaei, Westminster, CO (US); Justin Colwell, Arvada, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 115 days.

(21) Appl. No.: 14/569,673

(22) Filed: Dec. 13, 2014

(65) Prior Publication Data
US 2015/0172958 A1 Jun. 18, 2015

Related U.S. Application Data

(60) Provisional application No. 61/916,064, filed on Dec. 13, 2013.

(51) Int. Cl.
*H04W 28/08* (2009.01)
*H04W 48/06* (2009.01)
*H04W 28/22* (2009.01)

(52) U.S. Cl.
CPC .......... *H04W 28/08* (2013.01); *H04W 48/06* (2013.01); *H04W 28/22* (2013.01)

(58) Field of Classification Search
CPC ...... H04W 28/08; H04W 48/06; H04W 28/22
See application file for complete search history.

(56) References Cited

U.S. PATENT DOCUMENTS

| 8,144,587 | B2 * | 3/2012 | Heinz | H04L 12/5695 370/235 |
|---|---|---|---|---|
| 2003/0039256 | A1 * | 2/2003 | Carlberg | H04L 49/254 370/395.64 |
| 2005/0163059 | A1 * | 7/2005 | Dacosta | H04L 41/0896 370/252 |
| 2012/0011365 | A1 * | 1/2012 | Schmidt | G01D 21/00 713/168 |
| 2014/0269364 | A1 * | 9/2014 | Knapp | H04W 84/18 370/252 |
| 2015/0120930 | A1 * | 4/2015 | Kamthe | H04W 48/20 709/226 |
| 2015/0327153 | A1 * | 11/2015 | Tervonen | H04W 48/08 370/235 |

OTHER PUBLICATIONS

IEEE Standard for Information technology—Telecommunications and information exchange between systems—Local and metropolitan area networks—Specific requirements Part 11: Wireless Lan Medium Access Control (MAC) and Physical Layer (PHY) Specifications Amendment 1: Radio Resource Measurement of Wireless LANs, IEEE, Jun. 12, 2008.

(Continued)

*Primary Examiner* — Ajay Cattungal
(74) *Attorney, Agent, or Firm* — Great Lakes Intellectual Property, PLLC.

(57) ABSTRACT

Managing connections to be established between clients and access points for the purposes of accessing wireless services is contemplated. The connections may be managed according to a predictive load balancing strategy where connections may be established and adjusted in anticipation of predicted client demands, such as to achieve an optimized throughput.

20 Claims, 2 Drawing Sheets (56) References Cited

OTHER PUBLICATIONS

IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 9: Interworking with External Networks, IEEE, Feb. 25, 2011.
Wi-Fi Provisioning Framework Specification WR-SP-WiFi-MGMT-104-140311, CableLabs, Mar. 11, 2014.
Wi-Fi Radio Resource Management (RRM)/Self Organizing Networks (SON) Technical Report WR-TR-RRM-SON-V01-140926, CableLabs, Sep. 26, 2014.

\* cited by examiner

Fig. 1

PREDICTIVE LOAD BALANCING

CROSS-REFERENCE TO RELATED APPLICATIONS

This application claims the benefit of U.S. provisional Application No. 61/916,064 filed Dec. 13, 2013 the disclosure of which is incorporated in its entirety by reference herein.

TECHNICAL FIELD

The present invention relates to managing organized networks of the type relying on a plurality of access points to provide wireless services to a plurality of clients, such as but not necessary limited to managing connections between the access points and clients in a manner intended to optimize throughput in anticipation of future signaling demands.

BACKGROUND

An organized network may be considered as any type of network relying upon a plurality of network elements willing or capable of operating in response to instructions received from a server, controller or other administrative entity. The network elements may correspond with access points or other types of nodes having capabilities sufficient to facilitate establishing wired and/or wireless connections with clients desiring access to services available therethrough. A Self-organizing Network (SON) is one type of network designed to enable clients to wirelessly communicate with affiliated network elements of a common service provider and/or to enable clients to communicate with non-affiliated network elements of other service providers and roaming partners. A centralized self-organizing network server (C-SON) may be located in the cloud to facilitate directing operations of the SON, e.g., both affiliated and non-affiliated network elements may agree to operate according to instructions received from the C-SON.

SON and other types of network arrangements where the network elements agree to operate according to a common methodology may become more prevalent as more and more wireless access points are deployed, particularly when wireless access points are deployed within proximity to each other and/or have wireless signaling ranges overlapping with each other. One non-limiting aspect of the present invention contemplates leveraging the proximity of such network elements and the capability to commonly control the network so as to optimizing throughput and achieve other benefits by managing the network elements according to a centralized authority.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
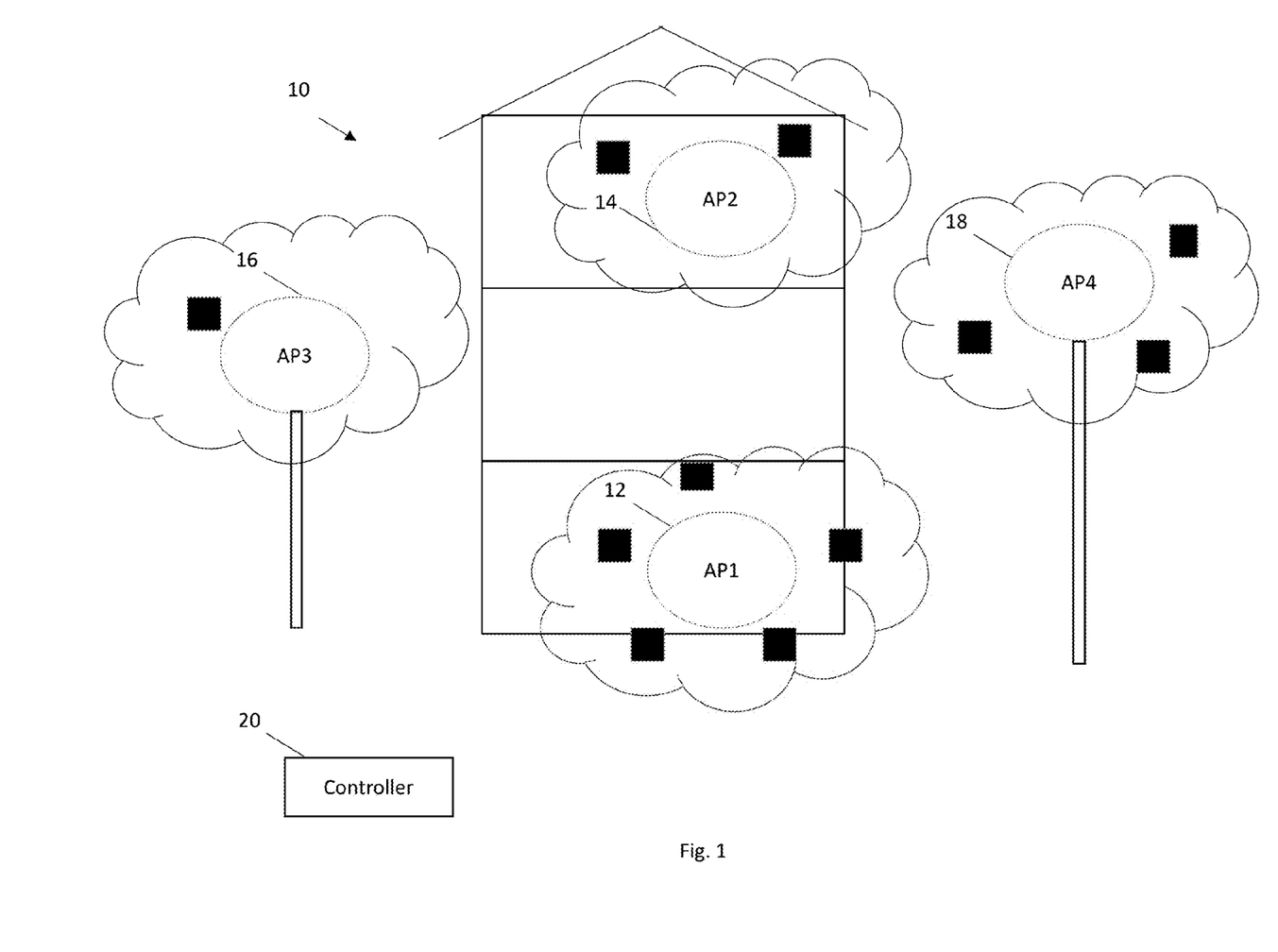
FIG. 1 illustrates an organized system in accordance with one non-limiting aspect of the present invention.

FIG. 1 illustrates an organized system 10 in accordance with one non-limiting aspect of the present invention. The system 10 depicts an exemplary environment having a plurality of wireless access points 12, 14, 16, 18 tasked with facilitating wireless services for a plurality of wireless clients (shown with boxes). A controller 20 configured in accordance with the present invention may be included to facilitate managing one or more of the access points 12, 14, 16, 18 according to a load balancing stratagem contemplated herein. The controller 20 may be a standalone, network-based device, as shown, and/or integrated within one or more of the access points 12, 14, 16, 18 and configured to facilitate the operations contemplated herein. The access points 12, 14, 16, 18 may be Wi-Fi, cellular or other wireless capable devices having capabilities sufficient to provide wireless spectrum to authenticated clients or clients otherwise having completed a sign-on operation or similar handshake therewith. The access points 12, 14, 16, 18 may be connected to other wired/wireless networks and/or a backbone network having capabilities sufficient to facilitate long-haul transport of signaling associated with the one or more connected clients.

Wireless signaling between the access points 12, 14, 16, 18, clients and/or controller 20 may be compliant with the Institute of Electrical and Electronics Engineers (IEEE) 802.11 series of standards, the disclosures of which are hereby incorporated by reference in their entireties herein. The attendant wireless signaling may operate according to Part 11: Wireless LAN Medium Access Control (MAC) and Physical Layer (PHY) Specifications, Amendment 1: Radio Resource Measurement of Wireless LANs (IEEE 802.11k) and/or Amendment 9: Interworking with External Networks (Hotspot 2.0, IEEE 802.11u). The wireless signaling may correspond that described in the CableLabs technical report for Wireless Wi-Fi entitled Wi-Fi Radio Resource Management (RRM)/Self Organizing Networks (SON) Technical Report (WR-TR-RRM-SON-V01-140926) and the CableLabs specification entitled Wi-Fi Provisioning Framework Specification (WR-SP-WiFi-MGMT-104-140311), the disclosures of which are hereby incorporated by reference in its entirety herein. The wireless signaling may also correspond with cellular standards, such as Long-Term Evolution (LTE) based on the Global System for Mobile Communications (GSM)/Enhanced Data rates for GSM Evolution (EDGE) and Universal Mobile Telecommunications System (UMTS)/High Speed Packet Access (HSPA) network technologies developed by the 3rd Generation Partnership Project (3GPP) as specified in its Release 8 and 9 document series and/or TS 36.201, 36.300, 36.304, 36.306, 36.321, 36.322, 36.323, 36.331, 36.401, 36.306 and 36.902 (self-organizing Network (SON)), the disclosures of which are hereby incorporated by reference in their entireties herein. Of course, the access points 12, 14, 16, 18 and the clients may optionally be considered as Internet of Things (IoT) devices and capable of Time Division Multiple Access (TDMA), Orthogonal Frequency Division Multiplexing (OFDM), Orthogonal Frequency Division Multiple Access (OFDMA), Single Carrier Frequency Division Multiple Access (SC-FDMA), Data Over Cable Service Interface Specifications (DOCSIS) 3.x, Long Term Evolution (LTE), LTE-Advanced (LTE-A), Wi-Max, Wi-Fi, Digital Video Broadcasting-Terrestrial (DVB-T), Digital Video Broadcasting-Handheld (DVB-H), Zigbee, ZWave etc., the disclosures of which are hereby incorporated by reference in their entireties.

A wireless signaling range of each access point 12, 14, 16, 18 is generically illustrated for exemplary purposes as the associated wireless signaling range may vary depending on signal strength, environmental obstructions, antenna configuration, etc. The wireless signaling range of each access point 12, 14, 16, 18 may overlap with one or more of the other access points 12, 14, 16, 18 and/or clients connected to one access point 12 may be within wireless signaling range of one or more of the other access points 14, 16, 18. The access points 12, 14, 16, 18 and the clients may connect or communicate with one or more of the access points 12, 14, 16, 18 as a function of various messages exchange therebetween. A client within signaling range of multiple access points 12, 14, 16, 18 may decide which one of the multiple access points 12, 14, 16, 18 to connect with as a function of advertisement messages transmitted from the corresponding access point 12, 14, 16, 18. IEEE 802.11u, for example, allows a client to query an access point 12, 14, 16, 18 for information like a name of the associated access point operator, capabilities of the associated wireless network, emergency alert information, geo-spatial and civic locations of the access point, potential roaming partners, etc. using Access Network Query Protocol (ANQP) protocol. The client may use this information to select one of the access points 12, 14, 16, 18 and thereafter negotiate with the selected access point for use of its wireless spectrum. The access points 12, 14, 16, 18 may accept or deny access requests depending on roaming agreements, subscriptions and any number of other influences.

IEEE 802.11k, section 5, describes additional measurements that may be utilized in accordance with the present invention to facilitate selecting and assessing performance of various access points 12, 14, 16, 18 as a function of a radio resource measurement (RRM). The RRM may include the following measurements: beacon, frame, channel load, noise histogram, STA statistics, location configuration information (LCI), neighbor report, link measurement and transmit stream/category measurement. IEEE 802.11k defines each measurement as follows:

Beacon: The Beacon request/report pair enables a STA to request from another STA a list of APs it can receive on a specified channel or channels. This measurement may be done by active mode (like active scan), passive mode (like passive scan), or beacon table modes. If the measurement request is accepted and is in passive mode, a duration timer is set and the measuring STA monitors the requested channel, measures beacon, probe response, and measurement pilot power levels (RCPI), and logs all beacons, probe responses, and measurement pilots received within the measurement duration. If the measurement request is in active mode, the measuring STA sends a probe request on the requested channel at the beginning of the measurement duration, then monitors the requested channel, measures beacon, probe response, and measurement pilot power levels (RCPI), and logs all beacons, probe responses, and measurement pilots received within the measurement duration. If the request is beacon table mode, then the measuring STA returns a Beacon Report containing the current contents of any stored beacon information for any channel with the requested SSID and BSSID without performing additional measurements.

Measurement Pilot: The Measurement Pilot frame is a compact Action frame transmitted periodically by an AP at a small interval relative to a Beacon Interval. The Measurement Pilot frame provides a subset of the information provided in a Beacon frame, is smaller than a Beacon, and is transmitted more often than a Beacon. The purpose of the Measurement Pilot frame is to assist a STA with scanning.

Frame: The frame request/report pair returns a picture of all the channel traffic and a count of all the frames received at the measuring STA. For each unique Transmitter Address, the STA reports the Transmitter Address, number of frames received from this transmitter, average power level (RCPI) for these frames, and BSSID of the transmitter.

Channel load: The channel load request/report pair returns the channel utilization measurement as observed by the measuring STA.

Noise histogram: The noise histogram request/report pair returns a power histogram measurement of non-IEEE 802.11 noise power by sampling the channel when virtual carrier sense indicates idle and the STA is neither transmitting nor receiving a frame.

STA statistics: The STA statistics request/report pair returns groups of values for STA counters and for BSS Average Access Delay. The STA counter group values include: transmitted fragment counts, multicast transmitted frame counts, failed counts, retry counts, multiple retry counts, frame duplicate counts, Request to Send (RTS) success counts, RTS failure counts, Acknowledgement (ACK) failure counts, received fragment counts, multicast received frame counts, FCS error counts, and transmitted frame counts. BSS Average Access Delay group values include: AP average access delay, average access delay for each access category, associated STA count, and channel utilization Location: The Location request/report pair returns a requested location in terms of latitude, longitude, and altitude. It includes types of altitude such as floors and permits various reporting resolutions. The requested location may be the location of the requestor (e.g., Where am I?) or the location of the reporting STA (e.g., Where are you?)

Measurement pause: The measurement pause request is defined, but no report comes back from this request. The measurement pause permits the inclusion of a quantified delay between the execution of individual measurements that are provided in a series within a measurement request frame. The measurement pause used as the last measurement in a frame provides control of the measurement period when measurement request frames are to be repeated.

Neighbor report: The neighbor report request is sent to an AP, which returns a neighbor report containing information about known neighbor APs that are candidates for a service set transition. Neighbor reports contain information from the table dot11RRMNeighborReportTable in the MIB concerning neighbor APs. This request/report pair enables a STA to gain information about the neighbors of the associated AP to be used as potential roaming candidates.

Link measurement: The link measurement request/report exchange provides measurements of the RF characteristics of a STA to STA link. This measurement indicates the instantaneous quality of a link.

Transmit stream/category measurement: The Transmit Stream/Category measurement is a request/report pair that enables a QoS STA to inquire of a peer QoS STA the condition of an ongoing traffic stream link between them. The Transmit Stream/Category Measurement Report provides the transmit-side performance metrics for the measured traffic stream. Trigger conditions included in the Transmit Stream/Category Measurement Request may initiate triggered Transmit Stream/Category Measurement Reports upon detection of the trigger condition.

Figure 2:
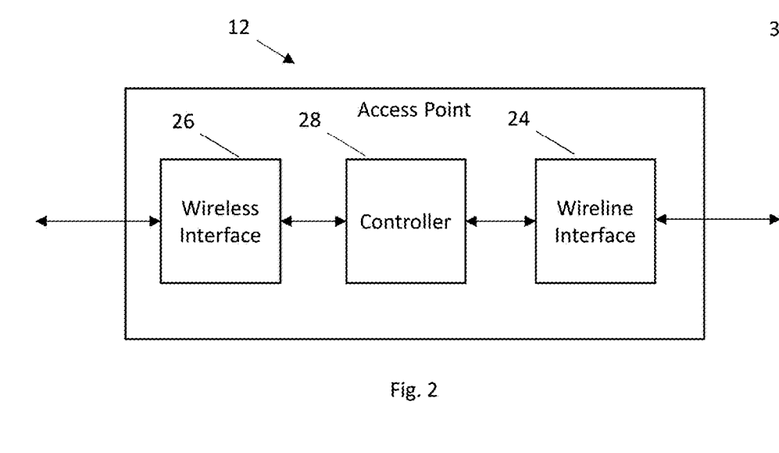
FIG. 2 illustrates an access point in accordance with one non-limiting aspect of the present invention.

FIG. 2 illustrates an access point 12 in accordance with one non-limiting aspect of the present invention. The access point 12 may include a wireline interface 24 for exchanging signaling with a backbone or long-haul network over a wired connection and a wireless interface 26 for exchanging wireless signals with clients within a corresponding signaling range. The access points 12, 14, 16, 18 and clients may optionally be configured to facilitate Multiple-Input Multiple-Output (MIMO) communications, such as that associated with U.S. patent application Ser. Nos. 14/181,640, 14/181,641, 14/181,643 and 14/181,645, the disclosures of which are hereby incorporated by reference in their entireties herein. The access point 12 may include a controller 28 having a processor and a computer-readable medium with a plurality of non-transitory instructions operable to facilitate controlling the access point 12 to facilitate the load-balancing management contemplated herein. The access point 12 may be considered as a gateway, a cable modem, a router, a eNodeB be, a set-top box (STB), a phone or virtually any other device having capabilities consistent with the operations associated with the present invention (access points may also operate as clients and clients may also act as access points). The access point 12 is shown to include the wireline interface 24 for exemplary purposes and as the wireline interface 24 may be replaced with a wireless interface or eliminated.

One non-limiting aspect of the present invention contemplates the system 10 acting as an organized network where the access points 12, 14, 16, 18 are operable in response to instructions received from the controller 20. The access points 12, 14, 16, 18 and the clients may be configured to facilitate cellular and/or Wi-Fi communications, including the multi-connection communications described in U.S. patent application Ser. No. 14/558,995, entitled Parallel Scheduling of Multilayered Media, and the multi-layered communications described in U.S. patent application Ser. No. 14/562,677, entitled Unification Sublayer for Multi-Connection Communication, the disclosures of which are hereby incorporated by reference in their entireties herein. The access points 12, 14, 16, 18 are illustrated in FIG. 1 depict one exemplary organized network environment where a first and second access point 12, 14 are located within a building having multiple subscribers, e.g., one access point per subscriber, and the third and fourth access points 16, 18 are included within neighboring buildings or as part of towers or other neighboring structures. The illustrated arrangement of the access points 12, 14, 16, 18 is presented for exemplary non-limiting purposes to demonstrate one of many scenarios contemplated by the present invention where access points may cooperate to achieve the optimization contemplated herein.

Figure 3:
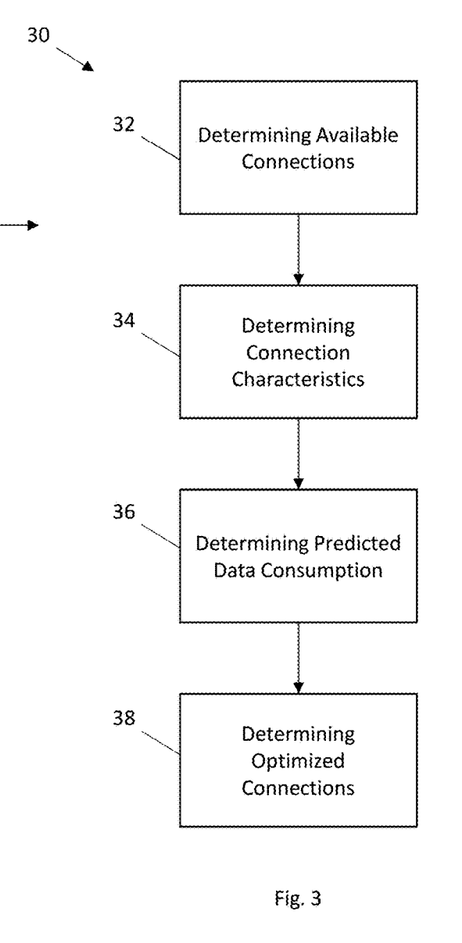
FIG. 3 illustrates a flowchart of a method for managing organized networks in accordance with one non-limiting aspect of the present invention.

FIG. 3 illustrates a flowchart 30 of a method for managing organized networks in accordance with one non-limiting aspect of the present invention. The method may be embodied in a non-transitory computer-readable medium having a plurality of non-transitory instructions operable with the controller or other entity having capabilities sufficient to facilitate implementation of the contemplated optimization operations. The use of a controller or other centralized authority to facilitate the contemplated optimization is presented for exemplary non-limiting purposes as similar operations and control may be facilitated through mutual agreement of access points/clients and need not necessarily be controlled or deployed in the cloud or other backbone network infrastructure. The contemplated management may be suitable for Wi-Fi and/or cellular wireless signals and is predominately described with respect to Wi-Fi-based communications for non-limiting purposes as Wi-Fi communications may be particularly susceptible to the noted operations due to the corresponding clients tending to more static and predictable than cellular clients.

Block 32 relates to determining available connections between the access points and the clients. An available connection may be considered as one where signaling may be established between one or more the access points and one or more of the clients. The available connections may be determined on an individual basis for each access point and/or client, such as in a table or other listing identifying all clients within a wireless signaling range of each access point and/or all the access point within wireless signaling range of each client. It may be presumed that a connection is available whenever one of the clients is within wireless signaling range of one of the access points. Connection availability may also be contingent on other factors, such as whether the client is capable of communicating with an access point, e.g., a Wi-Fi only client may be unable to communicate with a cellular access point and/or the client may be a legacy client unable to communicate with newer access points or vice versa, or whether the client includes sufficient authorizations to communicate with a particular access point. A test message or a test authentication process may be performed between the access points and clients to confirm connection availability before actually granting or establishing a connection between access points and clients.

Connection availability may also be dependent on service level agreements, subscriber opt-in status or other factors indicating client preferences for connecting with certain access points. As described below in more detail, clients may be forced to disassociate with one access point in order to connect to another access point, such as in the manner described in U.S. patent application Ser. No. 14/569,669, entitled Wireless Access Point Load Balancing, the disclosure of which is hereby incorporated by reference in its entirety herein, and a client's desire to do so may influence whether certain connections are determined to be available. A roaming tendency or frequency at which a client transitions through wireless signaling ranges of each access point may also influence connection availability, e.g., a client may be required to be within wireless signaling range of particular access point for a sufficient period of time before determining connection availability and/or the client may be required to have a pattern or consistent history of being within wireless signaling range of certain access points during certain time periods. The available connections may generally correspond with any connection likely to be available between a client and an access point in the future or for a time period sufficient to implement the optimization strategies contemplated herein, e.g., for the next the few minutes, hours or days.

Block 34 relates to determining connection characteristics for the available connections. The connection characteristics may include RRM data for the corresponding client/access point, relatively signaling strength (RSS) between the corresponding client and access point (e.g., the RSS may be measured and/or calculated based on relative position or history), number of associated clients (e.g., load or number of clients already connected or authorized for access to wireless services of the access point), supported modulation coding scheme (MCS) rates, type of client (heavy v/s light user), predicted time for session, Distributed Coordination Function (DCF) settings or averages for Carrier Sense Multiple Access with Collision Avoidance (CSMA/CA), backoff timers, number of probes and/or authentication requests, etc. The connection characteristics may be stored in a database associated with the controller so as to enable the corresponding information and data of the connected/managed access points and the clients to optionally be assessed not only across different channels in the same band but also across different bands if the access point is Dual Band Dual Cell (DBDC). The SON server or illustrated controller may not only maintain the database for all the access points in its domain but also similar information on the clients that each of its active access points serves or has served in the past.

The connection characteristics may also be used in conjunction with the connection availability determination noted above to facilitate determining available connections. Network performance and throughput can be the affected by sticky clients or clients connecting to an edge of the wireless signaling range, which may generally be characterized as those having a relative signaling strength below a desired threshold. Connections determined to be available but with a relative signaling strength below a desired threshold may be eliminated from further consideration, unless of course it is anticipated that the signaling range will change when the contemplated optimization is eventually implemented. The relative signal strength of a client to the relative signal strength for each available connection may be based on measured variables, such as those derived from messaging or testing conducted between the corresponding client and access point, and/or based on estimations determined from known information, e.g., a relative signaling strength of the client to one access point may be sufficient to estimate that clients relative signaling strength to another access point if geolocation information or relative positioning of the two access points is known.

Block 36 relates to predicting data consumption for each of the managed clients. As with of the process for preventing certain connections from being determined as being available, some clients may opt out or otherwise be excluded from data consumption consideration due to selection preferences or from simply being unavailable for management. The opting out of certain access points and/or clients may still enable other clients and access points to be managed as contemplated herein, including managing an access point servicing clients opting out of consideration if the corresponding access point is capable of servicing other, manageable clients. The predicted data consumption may be performed based on historical trends or characteristics of the client and/or the subscriber or user associated therewith. One non-limiting aspect of the present invention contemplates tracking data consumption according to amounts of data used (e.g., bits/bytes), traffic type or other characteristics of the service or data being exchanged relative to repeatable or recurring events.

The predicted data consumption may look at an upcoming time period, such as the next few minutes, hours, days, etc., to identify likely consumption of a particular client for the corresponding time period. This may include looking at trends or historical activities of a particular client relative to the upcoming time period to discover tendencies or characteristics having a certain probability to continue. A traffic type may be reviewed throughout the course of a day, week, etc. to identify particular periods during which a client may typically watch television versus periods during which the client may typically browse the Internet or engage other non-video traffic. Periods during which a client may not access any services or may not typically consume bandwidth/spectrum may also be important to analyze and trend as those periods may be opportunities to transfer the client to a slower connection or to add clients to the corresponding access point with the understanding that the additional load may not unduly influence performance since the other client is unlikely to be active.

One non-limiting aspect of the present invention contemplates an on-going optimization process where established connections may be changed and/or continued in order to optimize throughput as function of client variability. The predicted data consumption may correspond with the frequency of the optimization and may be undertaken for any upcoming time period and may be varied over time, e.g., optimization may be performed more frequency during high traffic periods than low traffic periods (during evening more so than the middle of the night). The predicted data consumption may be estimated as a function of predefined values for certain traffic types, e.g., video may have one default value and web browsing may have a lower default value, and/or actual number of bits/bytes typically consumed. Averages for a preceding period may be generated in the event a managed client is new of otherwise lacks a sufficient history to establish a trend or simply has no identifiable trend. Such a consumption estimate may assume the client is likely to continue its current state of activity, at least for the next time period for optimization, such that the average amount of data consumed for a preceding period may be used in place of a historical trend.

Block 38 relates to determining optimized connections. The optimized connections may correspond with a combination of the available connections deemed mostly like to maximize throughput or achieve other network performance metrics for the predicted data consumption. The optimized connections may be determined by iteratively analyzing each possible connection for a client relative to each of the other clients, optionally limiting each client to a single connection, until a combination of connections is determined to be the best. The connection-by-connection analysis may review the relative signal strength and amount of data predicted for each connection to determine throughput for the connection relative to similarly determined throughputs required in order to sufficiently connect the other clients. One client connecting to one access point may influence throughput of another client connected to the same or different access point. The throughput influence for all possible connections may thus be analyzed to determine the combination of connections likely to generate the greatest throughput either for a particular client(s), access point(s) and/or the entire managed network given the predicted activities of the clients for the corresponding time period.

One non-limiting aspect of the present invention contemplates the controller invoking a load balancing algorithm, including processing all the inputs at hand for neighboring access points (APs), client PHY parameters, client patterns, historical data and arranging/placing each of the APs in a manner which may not only reduce interference but also makes sure that heavy traffic users obtain a higher preference than light ones, whereby the optimized connections are determined according the following process:

1. Assume there are m APs under the control of the controller. Denote the ith AP, $1 \leq i \leq m$, as $AP_i$.
2. Assume that at the time of initiation of the following algorithm, $AP_i$ has $n_i$ served clients.
3. Denote the set of clients as $\{CL_1, CL_2, \ldots, CL_M\}$, where $M = \sum_{i=1}^{m} n_i$.
4. Using the RRM data that the controller obtains from each AP, the controller initiates a process to estimate the received signal level and consequently the supportable MCS for $CL_i$ ($1 \leq i \leq M$) had $AP_j$ ($1 \leq j \leq m$) served $CL_i$. Denote the supportable throughput of $CL_i$ when $AP_j$ serves $CL_i$ as $t_{ij}$.
5. Controller uses the historical data consumption of $CL_i$ ($1 \leq i \leq M$) to estimate the demanded throughput for $CL_i$ ($1 \leq i \leq M$) in a predefined span of time in future (T). T could indicate the time between two consecutive executions of the mapping algorithm described below. Denote the throughput demand of $CL_i$ in the considered span of time as $d_i$ ($1 \leq i \leq M$). If such historical data does not exist for $CL_i$, then set $d_i$ equal to the average throughput demand of $CL_i$ during the current association time.
6. Controller initiates a second process to map $CL_i$ ($1 \leq i \leq M$) to $AP_j$ ($1 \leq j \leq m$). The output of this mapping process is a M×m matrix $\pi$ with the property that each row has only one element of 1 and the rest of the elements are 0. If the ijth element is 1, it indicates that the ith client is mapped to $AP_j$. See below for an example with M=5 and m=3 where $CL_1$ is mapped to $AP_1$, $CL_2$ and $CL_4$ are mapped to $AP_2$ and $CL_3$ and $CL_5$ are mapped to $AP_3$:

$$\pi = \begin{bmatrix} 1 & 0 & 0 \\ 0 & 1 & 0 \\ 0 & 0 & 1 \\ 0 & 1 & 0 \\ 0 & 0 & 1 \end{bmatrix}$$

7. Denote the space for all M×m possible $\pi$ matrices as $\Pi$. The optimum mapping matrix (denote it by $\pi_o$) is the solution to the following optimization problem, which is performed across the space of all possible $\pi$ matrices (i.e., $\Pi$):

$$\pi_o = \underset{\Pi}{\mathrm{argmin}} \sum_{i=1}^{M} d_i - \sum_{i=1}^{M} \sum_{j=1}^{m} \pi_{ij} t_{ij}$$

8. After finding the optimum mapping matrix using the above algorithm, the controller passes the mapping information to the APs and the APs pass them to their currently served clients. If the output of the mapping matrix indicates that a client must disassociate with its current serving AP and re-associate with a new serving AP, the current serving AP instructs the client to do so. The controller may also instruct the new serving AP to expect an association request from the above-mentioned client.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having a plurality of non-transitory instructions operable with a server to facilitate predictive load balancing for a plurality of access points configured to provide wireless services to a plurality of clients, the non-transitory instructions being sufficient for:
   identifying a first plurality of connections occurring between the access points and the clients during a first time period, each of the first plurality of connections resulting from one of the access points having previously authenticated a corresponding one of the clients to access wireless services associated therewith;
   predicting a data consumption for the clients during a second time period occurring after the first time period;
   generating a plurality of connection matrices to represent possible connections between the access points and the clients; and
   determining a second plurality of connections to occur between the access points and the clients during the second time period based at least in part on the plurality of connection matrices, the second plurality of connections changing one or more of the first plurality of connections in anticipation of the predicted data consumption for the second time period.

2. The non-transitory computer-readable medium of claim 1 further comprising non-transitory instructions sufficient for:
   estimating throughput for each connection matrix to reflect expected throughput if the clients were to operate according to the predicted data consumption; and
   determining the second plurality of connections to be the connections specified in the connection matrix having the greatest estimated throughput.

3. The non-transitory computer-readable medium of claim 2 further comprising non-transitory instructions sufficient for estimating throughput for each connection matrix as a function of relative signal strength determined for each connection.

4. The non-transitory computer-readable medium of claim 3 further comprising non-transitory instruction sufficient for:
   determining the relative signal strength for each connection as a function of radio resource management (RRM) data transmitted from the access points;
   forcing disassociation of the clients associated with the changed one or more of the first plurality of connections; and
   instructing the forcefully disassociated clients to subsequently connect with a corresponding one of the wireless access points according to the second plurality of connections.

5. The non-transitory computer-readable medium of claim 1 further comprising non-transitory instructions sufficient for:
   generating the connection matrices to each define a unique combination of connections sufficient to insure each device is connectable to one of the access points;
   estimating throughput for each connection matrix to reflect expected throughput if the clients were to operate according to the predicted data consumption; and determining the second plurality of connections to be the connections specified in the connection matrix having a desired estimated throughput.

6. The non-transitory computer-readable medium of claim 5 further comprising non-transitory instructions sufficient for:
generating the plurality of connection matrices such that each connection matrix π corresponds with one of all possible unique combinations associated with M×m matrices for $CL_i$ (1≤i≤M) to $AP_1$ (1≤j≤m), wherein:
i) CL are the clients;
ii) AP are the access points; and
iii) each row of each matrix π has only one element with a value 1 and each remaining elements with a value of 0.

7. The non-transitory computer-readable medium of claim 6 further comprising non-transitory instructions sufficient for determining the connection matrix having the desired estimated throughput according to the following:

$$\pi_o = \underset{\Pi}{\operatorname{argmin}} \sum_{i=1}^{M} d_i - \sum_{i=1}^{M} \sum_{j=1}^{m} \pi_{ij} t_{ij},$$

wherein
i) all possible π matrices are denoted as π;
ii) the connection matrix having the greatest throughput is noted as $\pi_o$;
iii) d is the future demand for each client; and
iv) t is throughput calculated for each connection as a function of the corresponding relative signal strength.

8. The non-transitory computer-readable medium of claim 5 further comprising non-transitory instructions sufficient for determining the desired estimated throughput to correspond with the greatest throughput for a selected one of the plurality of clients or a selected one of the plurality of access points.

9. The non-transitory computer-readable medium of claim 1 further comprising non-transitory instructions sufficient for:
predicting the data consumption on a client-by-client basis;
determining the second time period to be one of a calendar day and a time of day; and
determining data consumption for each client based on data usage measured for the corresponding client during one or more previous time periods coinciding with the second time period.

10. The non-transitory computer-readable medium of claim 1 further comprising non-transitory instructions sufficient for:
predicting the data consumption on a client-by-client basis;
determining the second time period to be one of a calendar day and a time of day; and
determining data consumption for each client based on a data type most frequently associated with the corresponding client during one or more previous time periods coinciding with the second time period.

11. A non-transitory computer-readable medium having a plurality of non-transitory instructions operable with a controller to facilitate predictive load balancing for a plurality of access points configured to provide wireless services to a plurality of clients, the non-transitory instructions being sufficient for:
determining a relative signaling strength for each client relative to each access point;
estimating future demand for each client during an upcoming first time period;
generating a plurality of connection matrices where each connection matrix defines a unique combination of connections sufficient for connecting each client with one of the access points;
estimating throughput for each connection matrix based on the future demand estimated for each client and the relative signal strength of the connection defined for each client in the corresponding connection matrix; and
instructing the clients to connect with the access points for at least the first time period according to the unique combination of connections specified in the connection matrix having the greatest throughput estimate.

12. The non-transitory computer-readable medium of claim 11 further comprising non-transitory instructions sufficient for generating the plurality of connection matrices such that each connection matrix π corresponds with one of all possible unique combinations associated with M×m matrices for $CL_i$ (1≤i≤M) to $AP_j$ (1≤j≤m), wherein:
i) CL are the clients;
ii) AP are the access points; and
iii) each row of each matrix π has only one element with a value 1 and each remaining elements with a value of 0.

13. The non-transitory computer-readable medium of claim 12 further comprising non-transitory instructions sufficient for determining the connection matrix having the greatest throughput estimate according to the following:

$$\pi_o = \underset{\Pi}{\operatorname{argmin}} \sum_{i=1}^{M} d_i - \sum_{i=1}^{M} \sum_{j=1}^{m} \pi_{ij} t_{ij},$$

wherein
i) all possible π matrices are denoted as Π;
ii) the connection matrix having the greatest throughput is noted as $\pi_o$;
iii) d is the future demand for each client; and
iv) t is throughput calculated for each connection as a function of the corresponding relative signal strength.

14. A system for providing wireless services to a plurality of clients comprising:
a plurality of access points configured to provide the wireless services to one or more clients having completed an authentication process sufficient for establishing a connection therewith;
a controller in communication with each of the access points, the controller being configured to:
i) generate a plurality of connection matrices where each connection matrix defines a unique combination of possible connections between the clients and the access points;
ii) estimating throughput for each connection matrix based on a future demand estimated for each client;
iii) determining an optimum matrix to the one of the connection matrices estimated to have the greatest throughput; and
iv) instructing one or more of the clients for at least a first time period to establish connections with the access points matching the connections specified in the optimum matrix.

15. The system of claim 14 wherein:

the access points each include a radio having a Wi-Fi physical layer (PHY) to provide the wireless services; and the controller is configured to estimate throughput for each connection matrix as a function of radio resource management (RRM) data transmitted from the access points.

16. The system of claim 14 wherein the controller is configured to determine the future demand for each client as function of historical demand of the corresponding client during the first time period, the first time period reoccurring on a daily, weekly or monthly basis.

17. The system of claim 14 wherein the controller is configured to determine the future demand for each client has a function of a traffic type most frequently associated with each client for the first time period.

18. The system of claim 14 wherein the controller is configured to determine the future demand for each client as a function of an average backoff timer associated with each client for the first time period.

19. The system of claim 14 wherein the controller includes a non-transitory computer-readable medium having a plurality of instructions executable with a processor associated therewith to:

generate the plurality of connection matrices;

estimate the throughput for each connection matrix;

determine the optimum matrix;

instruct the one or more of the clients for at least a first time period to establish connections with the access points matching the connections specified in the optimum matrix;

generate the plurality of connection matrices such that each connection matrix $\pi$ corresponds with one of all possible unique combinations associated with M×m matrices for $CL_i$ (1≤i≤M) to $AP_j$ (1≤j≤m), wherein:

i) CL are the clients;

ii) AP are the access points; and iii) each row of each matrix $\pi$ has only one element with a value 1 and each remaining elements with a value of 0.

20. The system of claim 19 wherein the plurality of instructions are sufficient for determining the connection matrix having the greatest throughput estimate according to the following:

$$\pi_o = \operatorname*{argmin}_{\Pi} \sum_{i=1}^{M} d_i - \sum_{i=1}^{M} \sum_{j=1}^{m} \pi_{ij} t_{ij},$$

wherein i) all possible $\pi$ matrices are denoted as $\Pi$;

ii) the connection matrix having the greatest throughput is noted as $\pi_o$;

iii) d is the future demand for each client; and iv) t is throughput calculated for each connection as a function of the corresponding relative signal strength.

* * * * *